Aug. 13, 1957 W. G. KLEHFOTH 2,802,939
SQUELCH SYSTEM
Filed March 2, 1954
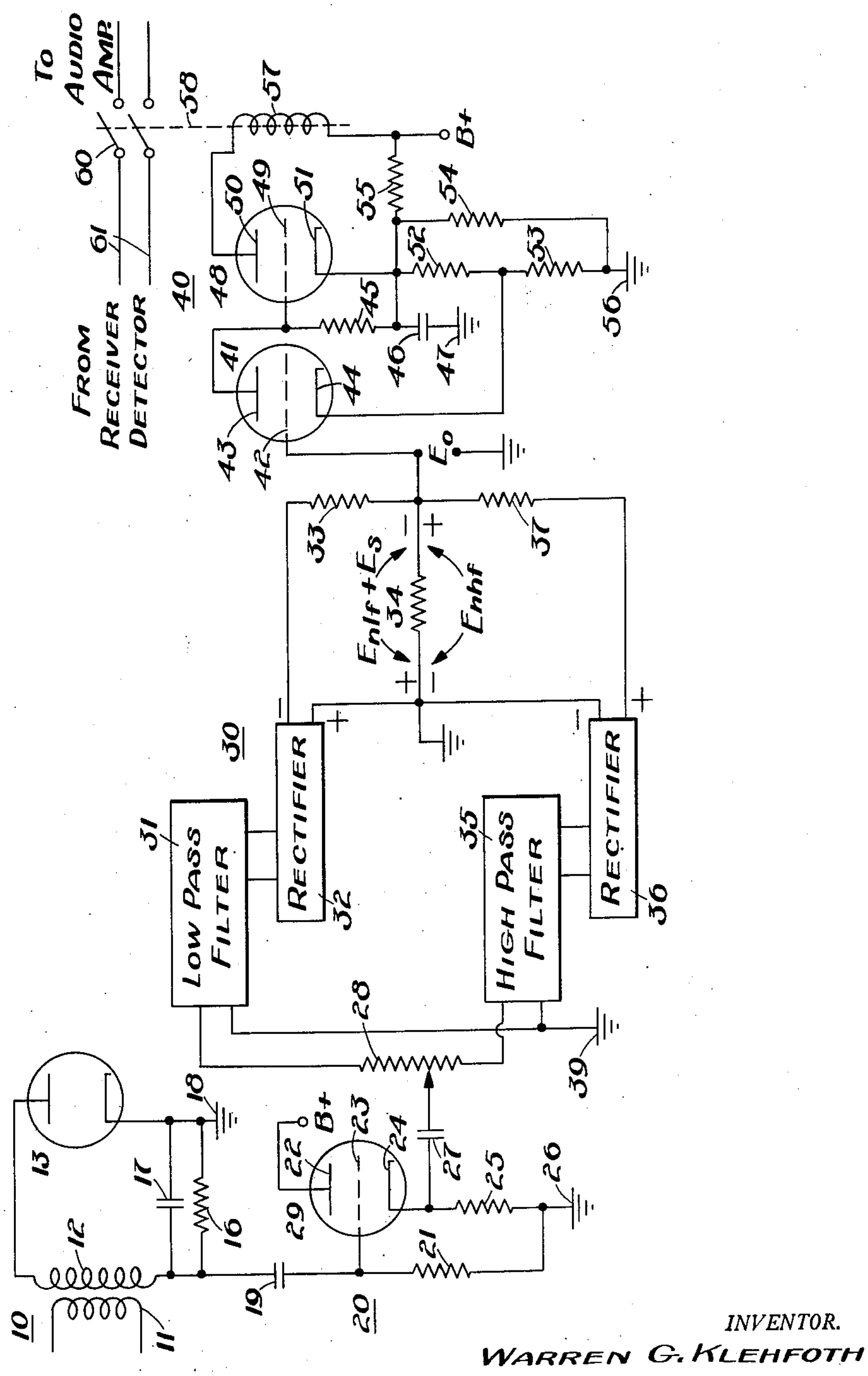
INVENTOR.
WARREN G. KLEHFOTH United States Patent Office 2,802,939

Patented Aug. 13, 1957

2,802,939

SQUELCH SYSTEM

Warren G. Klehfoth, Cedar Rapids, Iowa, assignor to Collins Radio Company, Cedar Rapids, Iowa, a corporation of Iowa Application March 2, 1954, Serial No. 413,536

5 Claims. (Cl. 250—20)

This invention relates to a method and circuit arrangement for improving the quality of radio reception; more particularly, it relates to noise suppression systems, generally known in the art as muting or squelch systems, for silencing the noise in the signal reproduction means.

Noise in the signal portion of the frequency spectrum adversely affects the quality of communication and where the noise energy level is high with respect to the intelligence or signal energy it may completely obliterate the signal. Such noise energy may arise, for example, from random noise sources such as thermal agitation, shot effect, contact and breakdown noise, and atmospheric or interstellar disturbances. Also, nonrandom noise sources such as ignition and electrical equipment may contribute to the noise energy.

When a radio receiver is maintained in the standby condition, but no signal is received, the noise voltages are nevertheless amplified to produce an audible output at the speaker. A similar situation exists when the receiving apparatus is being tuned between stations. This noise output is undesirable for numerous reasons. Where noise obliterates the signal to an extent that reception is useless, the audio output of the receiving apparatus should be silenced. Similarly, noise reception without the presence of a signal is objectionable as an annoyance to the operator and particularly when an operator of a number of communications receivers is giving his attention to one receiver while maintaining the others in the standby condition.

Thus it is apparent that proper squelch operation is essential to high quality communication. For the purpose of this specification, the expression "open the squelch" will be used to designate the operation of disabling the signal reproduction means of the radio apparatus to suppress the output. The expression "close the squelch" will be used to designate the operation of rendering the signal reproduction means operative.

Suppression systems are well known which silence the output of a receiver until a carrier of predetermined amplitude is received. This type of apparatus has become known as Codan after the initials of the descriptive expression "Carrier operated device anti-noise."

Also, suppression systems are known which respond to the reception of an input voltage of predetermined amplitude but tend to prevent the closing of the squelch due to the noise alone by a compensating action. Such compensation is obtained by employing the differential of two voltages to operate the squelch. Such a system is shown in the U. S. patent, 2,343,115 granted to D. E. Noble on February 29, 1944.

Such prior art systems operate very satisfactorily for many applications; yet, they are not without disadvantages which render them unsuitable in some respects. For example, it is undesirable that a noise signal alone or an unmodulated carrier alone is effective to close the squelch. Where the system is operated in response to the reception of a carrier wave of predetermined amplitude, whether compensated or not, to close the squelch, there is a loss of some signals which are of satisfactory quality. This would occur, for example, where the gain of the receiver varies from channel to channel or as a result of plate supply voltage fluctuations or other causes. With the receiver operating on one channel at a given gain, the audio section output becomes operative at a certain modulated carrier amplitude with a given signal plus noise to noise ratio. If the gain should decrease the received audio output would not become operative until a higher amplitude carrier was received, even though the signal plus noise to noise ratio remained the same. Thus, there would be a failure to receive a signal of satisfactory quality.

The quality of communications is dependent upon the ratio of signal energy plus noise energy to noise energy. The term "signal" is used to designate that portion of the energy in a given part of the frequency spectrum which represents intelligence to be communicated. The term "noise" is used to designate the remainder of the energy within that part of the frequency spectrum, whether it be random or nonrandom energy.

A high quality communication is obtained when the minimum signal plus noise to noise ratio is predetermined and established at some optimum value. If the ratio becomes less than this minimum standard the quality is intolerable and it becomes desirable to silence the receiver by opening the squelch. In order to operate the receiver at its maximum sensitivity, the disabling of the receiver must be effective at this minimum ratio for all conditions of operation. When this is attained the operation of the suppression system is independent of the gain of the receiver and permits reception of very weak signals. So long as the suppression system responds only to this ratio it is not subject to be operated by the reception of noise alone or an unmodulated carrier alone.

Accordingly, it is an object of the invention to present a squelch system and method effective to disable the reproduction means of a radio receiver when the ratio of signal plus noise to noise falls below a predetermined minimum value.

A further object is to provide a radio receiver with a suppression system which is effective to disable the receiver when the signal plus noise to noise ratio falls below a minimum value independently of variations in the receiver gain.

It is another object of this invention to provide a noise suppression system in which the squelch will not open in response to the reception of noise alone.

A further object is to present a radio receiver together with noise suppression system which will not close the squelch in response to the reception of an unmodulated carrier alone.

Further objects and advantages, together with the manner in which they are accomplished, will become apparent from the description which follows taken in conjunction with the accompanying drawing in which the single figure of the drawing represents an illustrative embodiment of the invention, shown partially in schematic and partially in block diagram form.

In controlling the quality of communication by the operation of a squelch circuit it is especially advantageous to use the ratio of signal plus noise to noise. Since noise voltages are distributed throughout the frequency spectrum, voltages in the signal frequency portion of the spectrum are present which are not readily distinguishable or separable from the signal voltages. It is therefore desirable to use the combination of signal and noise voltages as one measure of control in the squelch system. The combined voltages of signal plus noise are readily obtainable by employing a filter circuit which rejects all frequencies outside the signal frequency bandwidth.

Since noise energy is distributed over the frequency spectrum according to a determinable law of variation, the noise energy in one portion of the frequency spectrum bears a predetermined relation to the noise energy in another portion of the spectrum. This phenomenon may be used advantageously in order to obtain a voltage to be used as a second measure of control in the squelch system. For example, a filter circuit which rejects all frequencies within the signal frequency bandwidth may be used to obtain a voltage which is proportional to the noise voltages in the passband of the filter. In turn, this voltage is proportional to the noise energy which is within the signal frequency bandwidth. In accordance with this invention this relationship of the voltages derived from different portions of the frequency spectrum is utilized to obtain squelch opening at a fixed ratio of signal plus noise to noise.

The conditions for operation of the squelch at a fixed and predetermined ratio of signal plus noise to noise are best shown by a mathematical analysis and reference to the single figure of the drawing. The noise voltage passed by the high pass filter is assumed to be proportional to the voltage passed by the low pass filter. Thus $$\frac{E_{nhf}}{E_{nlf}}=C \qquad (1)$$

where $E_{nhf}$=voltage developed across resistor 34 by the high frequency noise.

$E_{nlf}$=voltage developed across resistor 34 by the low frequency noise.

$C$=a constant of proportionality.

When a signal is impressed upon the detector stage in addition to the noise voltages the following equation may be written:

$$E_0=-(E_{nlf}+E_s)+E_{nhf} \qquad (2)$$

where $E_0$=differential output voltage across resistor 34.

$E_s$=voltage developed across resistor 34 by the signal voltage.

Combining Equations 1 and 2:

$$E_0=-(E_{nlf}+E_s)+C(E_{nlf})$$

rearranging terms yields:

$$\frac{E_s+E_{nlf}}{E_{nlf}}=C-\frac{E_0}{E_{nlf}} \qquad (3)$$

If operation of the squelch is caused to occur when $E_0=0$, Equation 3 becomes:

$$\frac{E_s+E_{nlf}}{E_{nlf}}=C$$

Therefore, operation occurs at a constant value of signal plus noise to noise ratio. This ratio is established at a desired value by adjusting the ratio of the voltages $E_{nhf}$ and $E_{nlf}$ which is accomplished by adjusting the voltage attenuation in the two channels in the absence of a signal voltage.

Referring again to the single figure of the drawing, there is shown an illustrative embodiment of the inventive squelch circuit. Since the invention may be readily applied to any type of radio receiver whether it be amplitude modulated, frequency modulated or phase modulated, only so much of the receiver is shown as is necessary to illustrate the invention.

The squelch circuit illustrated includes a detector stage 10 which may serve as the second detector of the receiver as well as a detector for deriving a demodulated signal voltage for application to the subject squelch circuit. The output from the detector 10 is supplied through an amplifier stage 20 to a signal plus noise to noise ratio determining circuit 30. The output of the latter circuit 30 is applied to a disabling circuit 40 which is adapted to suppress the signal reproduction means of the radio receiver by actuation of circuit interruptor 60. A detailed description of the component circuits will precede a description of the circuit operation.

The detector stage 10 is coupled to the preceding stage (not shown) of the radio receiver by a coupling transformer provided with a primary winding 11 and a secondary winding 12. The terminals of the secondary winding are connected across the series combination of a diode rectifier 13 and a resistor 16. The resistor is shunted by a radio frequency bypass condenser 17 and one end of the shunt combination is connected to ground 18. This detector circuit, per se, forms no part of the present invention.

The demodulated voltage developed across the resistor 16 is coupled through the coupling capacitor 19 to the amplifier stage 20. As shown, the amplifier stage is a cathode follower, employing a triode tube 29 having a control grid 23 connected to the coupling capacitor 19. The grid 23 is provided with a grid leak resistor 21 connected from a grid terminal to ground 26. The cathode circuit includes the cathode resistor 25 connected between the cathode 24 and ground 26. The plate 22 is provided with the usual plate supply voltage B+. The output from this amplifier stage is coupled to the succeeding stage 30 through a coupling capacitor 27 connected at one of its terminals to the cathode side of resistor 25 and at its other terminal through a sliding contact to the resistor 28.

The signal plus noise to noise ratio determining circuit 30 comprises two channels and a voltage combining network. One of the channels includes the low-pass filter 31 which is connected with its pair of input terminals across one terminal of the resistance 28 and ground 39. The output terminals of this filter are connected to the input terminals of a rectifier 32 which develops a direct current potential, of the polarity shown, across the series combination of resistor 33 and resistor 34.

The other channel of the ratio determining circuit includes a high-pass filter with one of its input terminals connected to the other end of the resistor 28 and its other input terminal connected to ground 39. The output terminals of the high-pass filter are connected to the input terminals of the rectifier 36, which develops at its output a direct current potential of the polarity indicated. This potential is applied across the series combination of resistor 37 and the common resistor 34.

The low-pass filter 31 is designed in a manner well understood by those skilled in the art to have a cutoff frequency coinciding with the upper frequency limit of the signal frequency bandwidth. For example, in voice communication systems, it is common for the audio signal to vary over a range of 400 cycles per second to 4,000 cycles per second. With the low-pass filter designed accordingly, this low-pass channel will transmit all voltages within this range whether intelligence signals or low frequency noise. The voltage developed across the output terminals of the rectifier 32 will therefore be proportional in magnitude to the combined energy of the signal plus the low frequency noise.

The high-pass filter 35 is designed to reject all frequencies which are within the signal frequency range and to pass higher frequencies. Therefore, the direct current potential which is developed across the output terminals of the rectifier 36 is proportional in magnitude to the high frequency noise. The high frequency noise bears a predetermined relationship to the low frequency noise and this output voltage from rectifier 36 is also a function of the low frequency noise.

The output voltages from the two channels are combined in a differential manner across the common resistor 34 to derive a control voltage for application to the disabling circuit.

At the input of the ratio determining circuit the resistor 28 together with its sliding contact constitutes a voltage attenuating means. The position of the sliding contact determines the proportion of the control voltage that is applied across the low-pass filter input terminals. Similarly, the voltage input to the high-pass filter is adjusted. By this adjustment the differential voltage appearing across resistor 34 may be established at a desired value for a given operating condition.

The differential control voltage across resistor 34 is connected to the disabling circuit to control the conduction of tube 41. Tube 41 includes the control electrode 42, a plate electrode 43 and a cathode electrode 44 and comprises the first stage of the positive acting disabling circuit. The plate electrode is connected through a load resistance 45 and a resistor 55 to a plate supply voltage B+. The cathode circuit of tube 41 includes the cathode resistor 53 connected between the cathode 44 and ground 56. A bypass condenser 46 is connected between the common terminal of the resistors 45 and 55 to ground 47.

The second stage of the disabling circuit includes the tube 48 which is provided with a control electrode 49 connected to the plate side of the load resistance 45 in the preceding stage. The plate circuit of the tube 48 includes the relay winding 57 and a plate voltage supply B+. Connected between the cathode 51 and the ground 56 is the cathode resistor 52 and the cathode resistor 53 of the preceding stage. The resistors 52 and 53 are shunted by resistor 54.

The control signal impressed upon the grid 42 of tube 41 is effective to control conduction in the plate circuit of tube 48 and hence the energization of the relay winding 57. Energization of the relay winding 57 is effective to displace a relay armature 58 to operate the circuit interruptor 60. The circuit interruptor is interposed in the conductors 61 which connect the detector stage of the radio receiver to the audio amplifier stages of the receiver.

In the operation of the system described, it is desirable to first establish the minimum ratio of the signal plus noise to noise at which the squelch closes and renders the receiver operative. This is accomplished by operating the receiver in the absence of a signal and adjusting the position of the movable contact on the resistor 28. The ratio of the voltage output across the terminals of the rectifier 32 to the voltage output across the terminals of the rectifier 35 is adjusted to establish the desired value of C, the ratio of signal plus noise to noise.

The value of the constant C must be greater than unity in order to prevent the operation of the quelch systems in response to noise voltages alone. This is readily understood when it is noted that the disabling circuit is designed to operate upon zero value of differential voltage across the resistor 34.

Once the system has been set for operation at a desired signal plus noise to noise ratio the operation for various conditions is as follows: In the absence of a signal voltage in the detector circuit the noise voltages nevertheless are amplified and without a suitable squelch system would produce an audible output in the speaker. Detection of the noise voltages in the detector 10 develops a voltage across the resistor 16 which in turn is amplified in the amplifier stage 20. The output from the amplifier stage is impressed across the wiper contact of a resistor 28 to ground. A portion of this voltage is applied across the input terminals of the low-pass filter 31, which is effective to pass all frequencies in the signal frequency range of the system. These voltages are rectified in the rectifier 32 and impressed across the series combination of resistors 33 and 34. A portion of the voltage output from the amplifier 20 is also applied across the input terminals of the high-pass filter 35 which rejects all frequencies within the signal frequency range. The output of this filter is impressed across the input terminals of the rectifier 36 and the rectified output is impressed with opposite polarity across the resistors 34 and 37. Since the ratio of the voltage output of the high frequency channel to the voltage output of the low frequency channel was established at a value greater than unity, a differential voltage appears across this common resistor. The polarity is such that a net positive voltage with respect to ground appears as the differential control voltage, $E_0$.

This positive differential control voltage $E_0$ is impressed upon the grid 42 of amplifier 41 and is effective to cause conduction in the plate circuit of the amplifier 41 which develops a voltage across resistor 45. The voltage developed by this resistor is impressed upon the grid 49 of the succeeding amplifier and is effective to bias this amplifier 48 to cutoff. Conduction in the cathode circuit of the amplifier stage 41 develops a voltage across resistor 53 which increases the potential of cathode 51 with respect to ground. The effect of this is to decrease the net potential difference between the grid 49 and cathode 51, thus positively preventing conduction in the plate circuit of tube 48.

With the amplifier stage 48 biased to cutoff the circuit interruptor relay winding 57 is de-energized and the circuit interruptor 60 remains in its normally open position. Thus, in the absence of a signal in the detector stage the signal reproduction means of the receiver is disabled.

It is to be noted that the reception of noise voltage alone, no matter how large, is not effective to cause the operation of the circuit to close the squelch. This feature is apparent from the preceding description since only a signal voltage in the low frequency channel is effective to increase the signal plus noise to noise ratio. An increase of noise causes the ratio to decrease.

It is further noted that the reception of unmodulated carrier alone is not effective to cause the operation of the squelch. Although, the reception of the carrier may be effective to reduce the noise voltages through the action of an automatic volume control or a voltage limiting action the ratio of the differential voltages developed across the resistor 34 remains greater than unity. This differential voltage will have a net positive value sufficient to maintain the receiver silenced by operation of the disabling circuit.

Upon the reception of a signal modulated carrier, the signal voltage is passed by the low frequency channel and the differential voltage appearing across the resistor 34 is diminished. If the signal strength is very low so that the signal plus noise to noise ratio is below the predetermined value, the net voltage across the common resistor 34 will remain positive to prevent closing the squelch. Should the signal strength increase sufficiently to achieve the established value of signal plus noise to noise ratio the net voltage across resistor 34 will be further diminished to the zero value. At this point, by reason of the less positive signal on the grid 42 of amplifier 41, the conduction in the plate circuit of the tube will decrease. This reduces the bias on the suceeding tube 48. This in turn, causes the conduction in the plate circuit of the tube 48 to increase, developing a voltage drop across the resistor 52. The positive voltage developed by this resistor is applied to the grid of tube 48. This action further increases the conduction in the plate circuit of the tube 48 and results in a positive action in the disabling circuit. Sufficient conduction in the relay winding 57 is established to insure actuation of circuit interrupter to the circuit closed position. Therefore, the squelch is closed and the output of the detector stage of the receiver is connected to the audio amplifier stages, and in turn, to the receiver speaker.

It will be noted that in the squelch system operated in accordance with this invention, the response of the squelch is entirely independent of the receiver gain. Although the gain may vary as the receiver is tuned from channel to channel or as the supply voltage fluctuates, the squelch circuit does not respond until the ratio of the signal plus noise to noise reaches the predetermined constant value.

By the present invention, there is provided a squelch system for a radio receiver which disables the receiver only in response to a predetermined signal plus noise to noise ratio. The response of the system is independent of variation in the receiver gain and the reception of either a noise voltage alone or an unmodulated carrier alone is ineffective to close the squelch.

Although the invention has been described with respect to a particular embodiment, many modifications will now occur to those skilled in the art. The illustrative embodiment is not to be construed as a limitation upon the scope of the invention; for a definition of the invention, reference is made to the appended claims.

I claim:

1. A squelch system for radio apparatus comprising a detector circuit for deriving a modulation voltage, means including a pair of frequency selective circuits for transmitting different portions of the frequency spectrum of said modulation voltage, a comparator means for deriving a control voltage proportional in magnitude to the difference of the output voltages of said selective circuits, means for disabling a portion of said apparatus, and means responsive to said control voltage for actuating said last named means when the said difference of the output voltages is substantially zero.

2. A squelch system for a radio receiver comprising a detector stage, an audio frequency filter and a first rectifier connected across the output of said detector stage, a high-pass filter which excludes frequencies in the audio frequency range and a second rectifier connected across the output of said detector stage, the voltage developed by said second rectifier exceeding the voltage developed by said first rectifier in the absence of a signal voltage in said detector stage, a common resistor, said rectifiers connected in opposed polarity across said common resistor to develop a control voltage, a receiver disabling means connected to said resistor and including an amplifier which is provided with an input from said control voltage and effective to maintain the squelch open in the absence of a signal.

3. A circuit for determining when the signal plus noise to noise ratio of the output voltage of a receiver detector falls below a predetermined value comprising, means for applying a signal modulated wave to said detector, a signal plus noise channel having an input terminal connected to the output terminal of said detector and including a low-pass filter, a rectifier and voltage attenuating means, a noise channel having an input terminal connected to the output terminal of said detector and including a high pass filter, a rectifier and voltage attenuating means, both of said voltage attenuating means being adjusted in relation to the noise voltages passed by the respective filters so that the voltage output of the second said rectifier exceeds the voltage output of the first said rectifier in the absence of a signal in the said detector, a means for combining said voltage outputs, the outputs of said rectifiers connected in opposite polarity across said voltage combining means for producing a control voltage, and circuit control means connected to said combining means and responsive to changes of polarity of said control voltage to maintain the squelch open until the polarity of said control voltage is that of the noise channel.

4. A squelch system for silencing a radio receiver when the signal plus noise to noise ratio is less than a predetermined value comprising a detector stage having input and output terminals, means for applying a signal modulated carrier wave to said input terminals, a first channel connected across said output terminals and including a low-pass filter having a frequency pass range coinciding with said signal frequency range and a voltage attenuating means, a second channel connected across said output terminals and including a high-pass filter having a frequency pass range outside the signal frequency range and a voltage attenuating means, said voltage attenuating means having relative values such that the ratio of the voltage output from said second channel to the voltage output from said first channel is equal to said predetermined value in the absence of a signal, circuit means for comparing the voltage output from said second channel with the voltage output from said first channel, and means connected to said circuit means for disabling said radio receiver when said voltage outputs are equal.

5. A squelch system for a radio receiver comprising a detector stage, means for supplying a signal modulated carrier to said detector stage, a first frequency selective channel connected to said detector and including a low-pass filter adapted to reject frequencies higher than the upper limit of the frequency range of the signal of said signal modulated carrier, a first rectifier connected to said low-pass filter, a second frequency selective channel connected to said detector and including a high-pass filter adapted to reject frequencies lower than the upper limit of the frequency range of the signal of said signal modulated carrier, a second rectifier connected to said high-pass filter, the output terminals of said first and said second rectifiers connected with opposite polarity across a common resistor, a first amplifier tube having plate, cathode and grid electrodes, an output resistor connected between said plate electrode and a plate supply voltage, a first cathode resistor connected between said cathode electrode and ground, means connecting one terminal of said common resistor to said grid electrode, a second amplifier tube having plate, cathode and grid electrodes, a relay winding connected between said second tube plate and a plate supply voltage, a second cathode resistor, said second cathode resistor and said first cathode resistor connected between said second tube cathode and ground, said second tube grid electrode connected to said output resistor, and receiver disabling means, said relay winding adapted when energized to actuate said disabling means.

References Cited in the file of this patent

UNITED STATES PATENTS

| | | |
|---|---|---|
| 1,968,460 | Llewellyn | July 31, 1934 |
| 2,115,813 | Jarvis | May 3, 1938 |
| 2,151,170 | Tellegen et al. | Mar. 21, 1939 |
| 2,247,085 | Goldman | June 24, 1941 |
| 2,586,190 | Wasmansdorff | Feb. 19, 1952 |
| 2,679,000 | Reynolds | May 18, 1954 |